Feb. 21, 1956 R. F. GRIECO 2,735,245
FIXTURE FOR SUPPORTING A TOOL SUBJECT TO GRINDING
Filed July 15, 1954 2 Sheets-Sheet 1
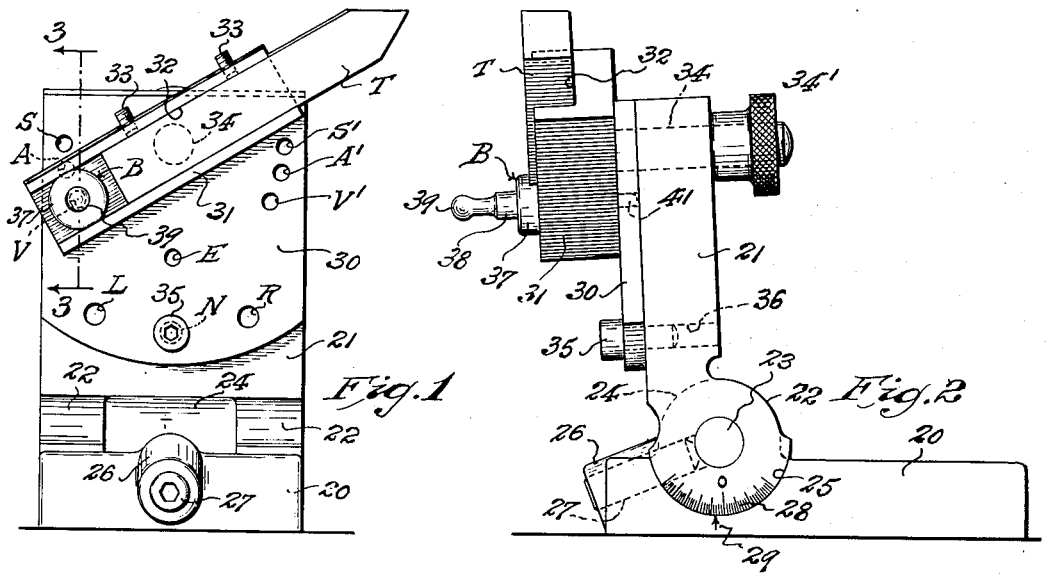
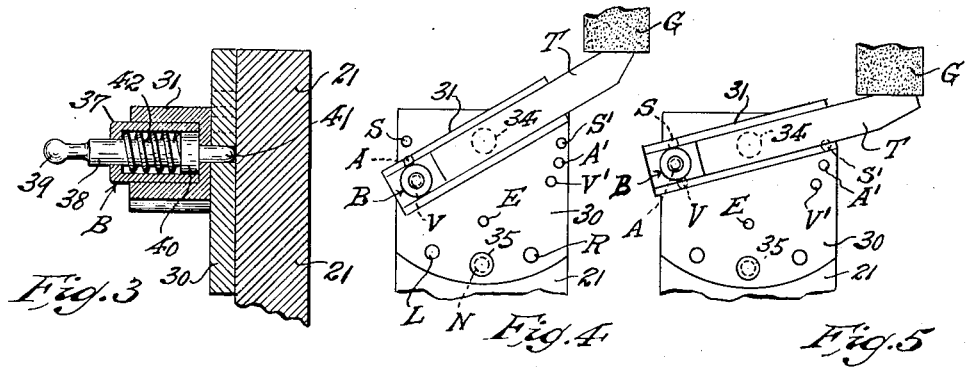
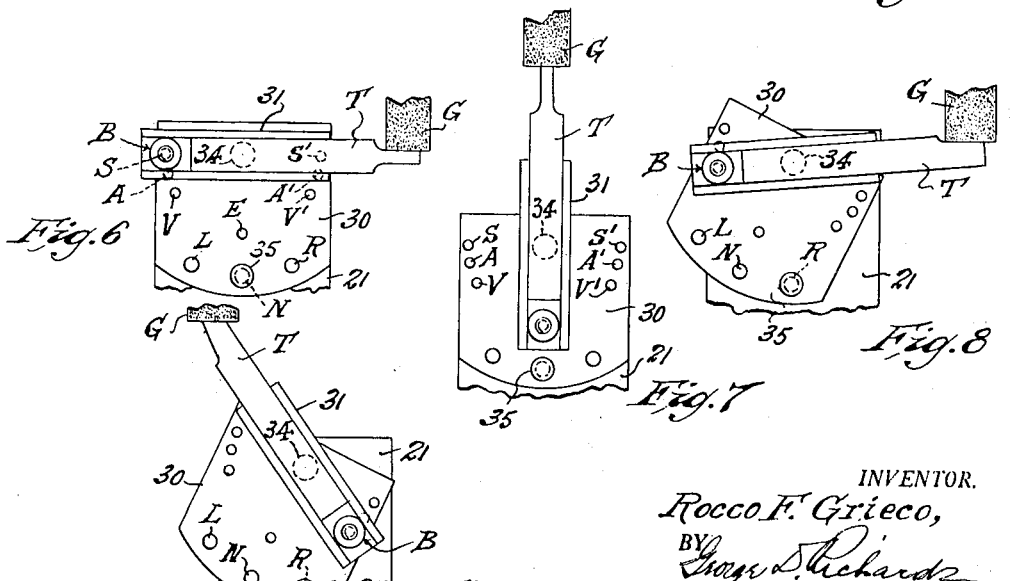
INVENTOR.
Rocco F. Grieco,
BY
George D. Richards
Attorney

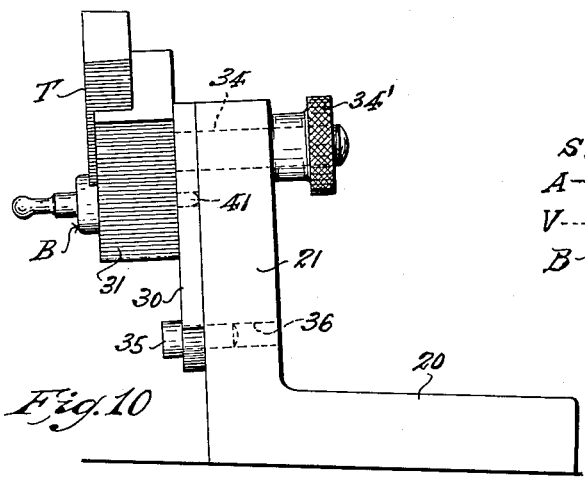
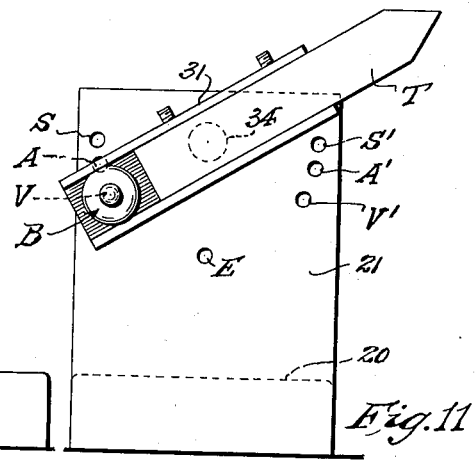
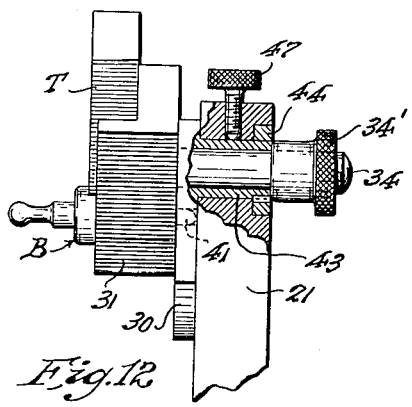
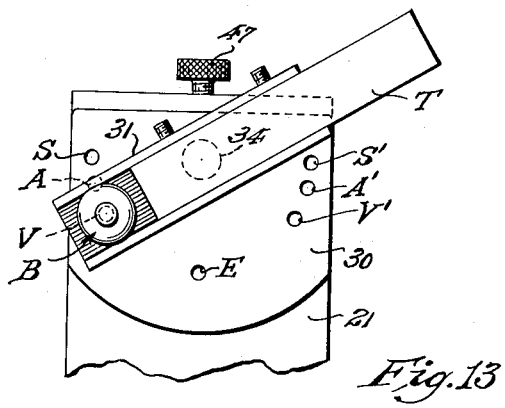
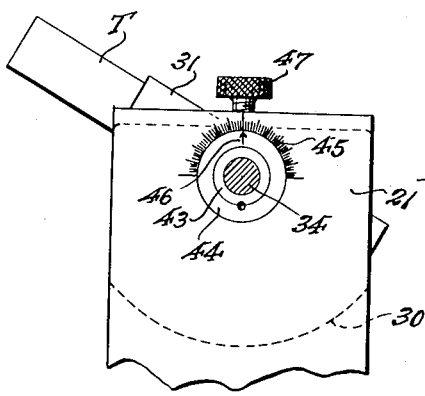

United States Patent Office 2,735,245
Patented Feb. 21, 1956

2,735,245

FIXTURE FOR SUPPORTING A TOOL SUBJECT TO GRINDING

Rocco F. Grieco, Millburn, N. J.

Application July 15, 1954, Serial No. 443,461

5 Claims. (Cl. 51—220)

This invention relates to means for supporting a tool, such as a thread cutting tool, for application thereof to a grinding wheel, whereby to shape or sharpen the cutting end thereof so as to provide the same with accurate cutting and clearance or relief angles.

The invention has for an object to provide a tool holding fixture comprising a base to support a suitably tilted carrier block, the angle of tilt of which determines the degree of clearance or relief angles to which the shaped cutting end of the tool is provided during a grinding operation, means being provided in connection with the carrier block to rotatably support a tool holding chuck, whereby to incline the tool with respect to the grinding wheel at a selected angle in each direction, i. e. to the right and left, so as to accurately grind opposite faces of the cutting end thereof, said chuck having manipulatable means for releasably locking the same in a selected angular position.

The invention has for a further object to provide in connection with the carrier block of the fixture, for cooperation with the rotatable tool holding chuck, a rotatively adjustable chuck positioning plate which is engageable by the chuck locking means to selectively position the chuck at a desired angle in each direction right and left of the perpendicular axis of the carrier block, according to the shape of tool cutting end desired to be produced, means being further provided for additionally adjusting the plate per se in inclined disposition to the right and left of the perpendicular axis of the carrier block, whereby to position the chuck for holding a tool subject to grinding either a right or a left offset cutting end of desired shape.

The above and other objects will be understood from a reading of the following detailed description of this invention in connection with the accompanying drawings, in which:

Fig. 1 is a front elevational view of one form of the tool supporting fixture of this invention; Fig. 2 is a side elevational view of the same; and Fig. 3 is a fragmentary cross-sectional view, taken on line 3—3 in Fig. 1.

Figs. 4 to 9 inclusive are diagrammatic views showing various illustrative positions of the tool holding chuck according to particular forms and dispositions of tool cutting end formations desired to be produced.

Fig. 10 is a side elevational view of a modified form of the tool supporting fixture of this invention.

Fig. 11 is a front elevational view of a further modified form of the tool supporting fixture of this invention.

Fig. 12 is a fragmentary side elevational view in part section, showing a modified means for adjusting the chuck positioning plate of the fixture; Fig. 13 is a front face elevational view of the same; and Fig. 14 is a rear face elevational view thereof, in part section.

Referring first to Figs. 1 to 3 inclusive, one form of the tool supporting fixture, according to this invention as therein shown, comprises a base plate 20 to which is connected an upstanding carrier block 21, which is adapted to be disposed at a selected angle of inclination from the perpendicular, whereby to predetermine the degree of clearance or relief angles to which side faces of the cutting end of a tool is to be provided. In this case, the carrier block 21 is adjustably connected with the base 20 so as to be tiltable to a selected degree of inclination. To permit this, the lower end of the carrier block is provided with hinging knuckle elements 22 which are fixedly connected to the ends of a hinge pin 23, the latter being rotatably supported by a bearing member 24 integral with the base 20, so as to be straddled by said hinging knuckle elements. Said hinging knuckle elements 22 turn in complemental seats 25 formed in the base 20. Threaded through a boss 26, which forms a unitary part of the base 20, is a set-screw 27, which, when turned home, engages and binds the hinge pin 23 against rotation, whereby to releasably fix the carrier block 21 in a selected tilted position. To select and indicate a desired degree of carrier block tilt, the marginal outer end surface of at least one of the hinging knuckle elements 22 is provided with scale graduations 28 which are cooperative with a perpendicular mark 29 with which the coincident side surface of the base 20 is provided.

Mounted upon and contiguous to the outer face of the carrier block 21 is a tool holding chuck positioning plate 30, the outer face of which is abutted by a rotatively movable tool holding chuck 31. Said chuck 31 comprises an elongated body having an outwardly open longitudinal channel 32 provided with a forward open end. Said channel 32 forms a seat to receive and embrace the body of a tool T, in such manner that the end portion of said tool body, which is to be ground, extends freely from the forward open end of said channel. The tool body T is releasably secured in the seating channel of the chuck by one or more set screws 33, which are threaded through a side wall of the chuck channel. Unitary with the chuck 31, to project rearwardly from and perpendicular to the back thereof intermediate its ends, is a pivoting member 34, which extends through the upper end portion of the carrier block 21, so as to be rotatably supported by the latter. Said pivoting member is provided with a screw-threaded rear end to receive a retaining nut 34'.

The chuck positioning plate 30, which is disposed intermediate the carrier block 21 and the chuck 31, is pivotally supported by its upper end portion on the pivoting member 34 to depend therefrom. Provided in the lower end portion of the chuck positioning plate 30 is a central opening N through which is passed a removable retaining screw 35 adapted to screw into an internally threaded opening 36 with which the carrier block 21 is provided, thereby to secure said chuck positioning plate in a normal perpendicular position relative to the carrier block 21. Said lower end portion of the chuck positioning plate 30 is provided with a second opening L which is disposed in a predetermined outwardly spaced relation, in one direction, to the central opening N, and at the same radial distance from the pivoting member 34 as that of said central opening N. By removal of the retaining screw 35, the chuck positioning plate 30 can be rotatively shifted, about the pivoting member 34, so as to align the opening L with the threaded opening 36 of the carrier block 21, and then held in said shifted position, for purposes hereinafter set forth, by the engagement of said retaining screw 35 therethrough. Similarly, also provided in the lower end portion of the chuck positioning plate 30 is a third opening R which is disposed in predetermined outwardly spaced relation, in the opposite direction, to said central opening N, and also at the same radial distance from the pivoting member 34 as that of said central opening N. By removal of the retaining screw 35, the chuck positioning plate 30 can be rotatively shifted to align the opening R with the threaded opening 36 of the carrier block 21, and then held in such shifted position, for purposes hereinafter set forth, by the engagement of said retaining screw 35 therethrough.

Provided in connection with the rearward end portion of the tool holding chuck 31 is a releaseable locking bolt means B (see Fig. 3) which is cooperative with the chuck positioning plate 30, whereby to hold the chuck 31 in various selected positions as may be required to present a tool T to a grinding wheel according to the shape of cutting end portion with which the tool is desired to be provided. Said locking bolt means B comprises a hollow barrel 37 which is affixed to the rearward end portion of the chuck 31 to project outwardly from the front thereof, and perpendicular to the plane of the chuck positioning plate 30. Axially movable in the barrel 37 is a bolt plunger 38, the outer end portion of which projects outwardly through the end wall of said barrel, and terminates in a suitably shaped finger piece 39. The inner end of the bolt plunger 38 is provided with a diametrically enlarged portion 40 which is normally stopped against the body of the chuck 31. Projecting from the inner end of the bolt plunger 38, through the body of the chuck, is a bolt nosing 41. A compression spring 42 is interposed between the outer end wall of the barrel 37 and the enlarged portion 40 of the bolt plunger, whereby to yieldably urge the bolt plunger to bolt nosing projecting position.

The chuck positioning plate 30 is provided with means selectively cooperative with the locking bolt means B of the chuck 31, whereby to selectively position the chuck and tool T supported thereby in required angular disposition, in respective opposite directions, so as to hold the tool relative to a grinding wheel subject to accurate grinding of opposite faces of its cutting end to cutting angles of desired formation. This means comprises left and right groups of bolt nosing engageable openings or sockets which are offset at equal radial distances from the axis of the pivoting member 34 about which the chuck 31 can be revolved. The left hand group of said openings or sockets comprises an opening or socket S disposed in a horizontal plane intersecting the axis of the pivoting member 34, whereby to position the chuck to hold a tool subject to grinding its cutting end to provide one cutting angle of a square thread cutting formation; an opening or socket A offset at such angle to a horizontal plane intersecting the axis of the pivoting member 34 as will position the chuck to hold a tool subject to grinding its cutting end to provide one cutting angle of an Acme thread formation; and an opening or socket V offset at a greater angle to a horizontal plane intersecting the axis of the pivoting member 34 as will position the chuck to hold a tool subject to grinding its cutting end to provide one cutting angle of a standard V-shaped thread cutting formation. The right hand group of openings or sockets comprises corresponding openings or sockets S', A' and V', respectively operative to position the chuck for holding a tool subject to grinding opposite cutting angles of the aforesaid respective thread cutting formations. The chuck positioning plate is further provided with an opening or socket E aligned in a plane perpendicular to the axis of the pivoting member 34 so as to position the chuck to hold a tool subject to grinding the end of a square thread or an Acme thread cutting formation.

In the use of the tool holding fixture, the carrier block 21 having been tilted to a position determinative of production of clearance or relief angles with respect to a cutting end formation to be produced, and a tool T having been fixed in the chuck 31, the fixture is mounted on a grinding machine in operative relation to the grinding wheel thereof, as e. g. by means of a magnetic chuck. Assuming that it is desired to provide the tool with a standard V-shaped cutting end formation; aligned with the longitudinal axis of the tool body, the chuck positioning plate is secured by the retaining screw 35 in its normal perpendicular position on the carrier block 21. The locking bolt means B of the chuck 31 being released, the chuck is revolved about its pivoting member 34 to bring the locking bolt means B in alignment with the opening or socket V of the left hand group of openings or sockets, whereupon the bolt plunger 38 is released for spring actuated inward movement which projects the bolt nosing 41 into said opening or socket V, thus positively locking the chuck 31 to the positioning plate 30 in position to present the tool to a grinding wheel G subject to grinding its cutting end to provide one cutting angle of the desired V-shaped thread cutting formation (see Fig. 4). To produce the opposite cutting angle of such V-shaped thread cutting formation, the locking bolt means B is released and the chuck then revolved to align and engage said lock bolt means with the opposite opening or socket V' of the right hand group of openings or sockets.

If it is desired to provide the tool with an Acme thread cutting formation, the above described operations are carried out by engaging the locking bolt means B of the chuck 31 respectively with openings or sockets A and A' of the positioning plate 30, whereby to dispose the chuck 31 for presenting the tool T subject to grinding operations for such purpose (see Fig. 5).

If it is desired to provide the tool with a square thread cutting formation, the above described operations are carried out by engaging the locking bolt means B of the chuck 31 respectively with the openings or sockets S and S' of the positioning plate 30, whereby to dispose the chuck 31 for presenting the tool T subject to grinding operations for that purpose (see Fig. 6).

If it is desired to square the extremity of either a produced Acme thread cutting formation or a square thread cutting formation, the chuck 31 is disposed in a perpendicular position and locked to the positioning plate 30 by engaging the locking bolt means B with the opening or socket E of the positioning plate (see Fig. 7).

In all operative positions of the chuck 31 as engaged with the positioning plate 30, said chuck is accurately disposed and positively held against displacement from the selected position during given grinding operations. Furthermore, selective disposition of the chuck can be quickly and easily accomplished, and each selected disposition is assured of positional accuracy by the positive predetermined interlocking of the chuck with the positioning plate.

It is is desired to provide the tool with any of the aforesaid thread cutting formations in either left hand or right hand offset relation to the longitudinal axis of the tool body, this can be accomplished by rotatively shifting the positioning plate 30, about the pivoting member 34, angularly to the left or right, whereby to incline its longitudinal axis relative to that of the carrier block 21, and thereupon securing the positioning plate in such angularly adjusted position by the retaining screw 35, in manner already above described. Illustratively, such shift and angular disposition of the positioning plate 30 to the left is shown in Figs. 8 and 9. When the chuck 31 is selectively adjusted on and interlocked with the thus shifted positioning plate in the manner above set forth, the produced thread cutting formation will be offset at a predetermined angle to the left of longitudinal axis of the tool. Angular shift of the positioning plate to the right will permit production of thread cutting formations offset to the right of the longitudinal axis of the tool body.

Referring to Fig. 10, there is shown therein a simplified form of the fixture according to this invention, wherein the base 20 and carrier block 21 are provided in the form of an integral or one-piece structure, with the carrier block 21' tilted to a fixed selected angular degree which predetermines the degree of clearance or relief angles to which the cutting end of the tool will be provided during grinding operations performed thereon. In other respects, this form of the fixture is the same in structure, and in mode of operation in use, as that hereinabove first described, but provides a somewhat less expensive fixture for use under conditions where non-variable clearance or relief angle production will be satisfactory.

Referring to Fig. 11, there is shown therein another simplified form of the fixture according to this invention, which is restricted in use to selectively grinding tools to any of the above mentioned types of thread cutting formations as aligned with the longitudinal axis of the tool body, i. e. excluding production of angularly offset disposition of such thread cutting formations. In this case, the chuck positioning plate 30 may be omitted, and the groups of chuck locking bolt engageable openings or sockets V, A and S, and V', A' and S' and E then located in the carrier block 21, upon the face of which the revolvable chuck 31 is directly mounted. In this modified construction, the carrier block 21 may be either of the tilt adjustable type or of the fixed tilt type. The fixture, as thus modified, provides a less expensive construction for use under conditions where angularly offset thread cutting formations are not required to be produced.

There may be a demand for a fixture according to this invention wherein, instead of limiting the rotative shift of the positioning plate 30, left or right, to only a selected predetermined angular degree, as in the first described form of the fixture, such rotative shift of the positioning plate 30 is subject to various angular degrees of rotative shift, whereby to select a desired degree of angular offset of the thread cutting formations to which the tool may be desired to be ground. In Figs. 12 to 14 inclusive is shown another modified form of the fixture of this invention by means of which variable rotative shift of the positioning plate 30 may be attained. To such end, the positioning plate 30 is provided with a rearwardly extending hollow tubular hub 43 which is journaled in the carrier block 21, and which pivots the positioning plate for rotative shift. Fixed on the outer end of said hub 43 is a collar 44, which is preferably countersunk in the rear face of the carrier block 21, and which serves to retain the hub 43 against axial displacement, and thus the positioning plate 30 in its superposed contiguous relation to the face of the carrier block 21. Suitably provided on the rear face of the carrier block 21 is a graduated scale 45 with which a complemental mark 46, on the outer face of the rotatable collar 44, can cooperate to select and indicate the degree of rotative shift to which the positioning plate 30 is desired to be set. A set screw 47, threaded through the carrier block 21, can be turned home to engage and bind the hub 43 in a selected rotatively adjusted position thereof, thereby to secure the positioning plate 30 in a selected rotatively shifted disposition. The pivoting member 34 of the chuck 31 is journaled in the bore of said hub 43, so as to revolvably support the chuck 31 for movement over the positioning plate relative to the groups of chuck locking openings or sockets with which the latter is provided. It will be understood that this modified construction of the fixture may be provided in connection with a carrier block 21 of either tilt adjustable type or of fixed tilt type.

Having now described my invention, I claim:

1. A fixture to support a cutting tool for grinding comprising a base, a transverse carrier block having a flat outer face upstanding from said base, an elongated chuck pivotally supported intermediate its ends in connection with said carrier block for revolving movement in plane parallel to the flat outer face of the latter, said chuck having a longitudinal channel to receive and support a tool for projection from its forward end, a flat positioning plate disposed contiguous to the flat outer face of said carrier block to lie intermediate the latter and said chuck, said positioning plate being pivotally supported for left and right rotative shifting movement about the axis of the pivotal support of said chuck, a manually releasable chuck locking bolt means carried by the rearward end portion of the chuck, said positioning plate having left and right groups of sockets offset from the pivotal axis of the chuck at predetermined radial angles and selectively engageable by said chuck locking bolt means, whereby to dispose the chuck in selected position to present the tool held thereby to a grinding wheel according to a given cutting end formation of the tool desired to be produced, and means to releaseably fix said carrier block selectively in a perpendicular normal position or in left or right rotatively shifted position accordingly as straight or offset cutting end formations of the tool are desired to be produced.

2. A fixture to support a cutting tool for grinding according to claim 1 wherein the positioning plate further includes a chuck locking bolt means engageable socket disposed in perpendicular offset relation to the pivotal axis of the chuck.

3. A fixture to support a cutting tool for grinding comprising a base, a transverse carrier block having a flat outer face upstanding from said base, means to pivotally connect the lower end of the carrier block to the base for tilting adjustment relative to the latter, said means comprising a hinging knuckle integral with the base, a hinge pin rotatably supported by said hinging knuckle, said carrier block having means to affix the same to end portions of said hinge pin, a set screw threaded through the hinging knuckle radial to the hinge pin and engageable with the latter, whereby to releasably secure the carrier block in selected tilted relation to the base, and said base and carrier block having cooperative scale markings to indicate degrees of tilt adjustment, an elongated chuck pivotally supported intermediate its ends in connection with said carrier block for revolving movement in plane parallel to the flat outer face of the latter, said chuck having a longitudinal channel to receive and support a tool for projection from its forward end, a flat positioning plate disposed contiguous to the flat outer face of said carrier block to lie intermediate the latter and said chuck, said positioning plate being pivotally supported for left and right rotative shifting movement about the axis of the pivotal support of said chuck, a manually releasable chuck locking bolt means carried by the rearward end portion of the chuck, said positioning plate having left and right groups of sockets offset from the pivotal axis of the chuck at predetermined radial angles and selectively engageable by said chuck locking bolt means, whereby to dispose the chuck in selected position to present the tool held thereby to a grinding wheel according to a given cutting end formation of the tool desired to be produced, and means to releaseably fix said positioning plate to said carrier block selectively in perpendicular normal position or in left or right rotatively shifted position accordingly as straight or offset cutting end formations of the tool are desired to be produced.

4. A fixture to support a cutting tool for grinding according to claim 3 wherein the positioning plate further includes a chuck locking bolt means engageable socket disposed in perpendicular offset relation to the pivotal axis of the chuck.

5. A fixture to support a cutting tool for grinding comprising a base, a transverse carrier block upstanding from said base, means to pivotally connect the lower end of the carrier block to the base for tilting adjustment relative to the latter, said means comprising a hinging knuckle integral with said base, a hinge pin rotatably supported by said hinging knuckle, said carrier block having means to affix the same to end portions of said hinge pin, a set screw threaded through the hinging knuckle radial to the hinge pin and engageable with the latter, whereby to releaseably secure the carrier block in selected tilted relation to the base, said base and carrier block having cooperative scale markings to indicate degrees of tilt adjustment, an elongated chuck pivotally supported intermediate its ends in connection with said carrier block for revolving movement in plane parallel to the outer face of the latter, said chuck having a longitudinal channel to receive and support a tool for projection from its forward end, and means to releasably secure said chuck in selected rotatively adjusted position, whereby to present a tool held thereby to a grinding wheel according to a given cutting end formation thereof desired to be produced.

References Cited in the file of this patent

UNITED STATES PATENTS

| | | |
|---|---|---|
| 2,448,309 | Grieco | Aug. 31, 1948 |
| 2,583,408 | Black | Jan. 22, 1952 |
| 2,594,574 | Marsden | Apr. 29, 1952 |
| 2,626,491 | Penkoff et al. | Jan. 27, 1953 |
| 2,677,315 | Hanson | May 4, 1954 |
| 2,688,828 | Aulenbach | Sept. 14, 1954 |